United States Patent [19]
Durham

[11] Patent Number: 6,040,787
[45] Date of Patent: Mar. 21, 2000

[54] LASER VEHICLE PARKING APPARATUS

[76] Inventor: Lamoyne W. Durham, 1844 Stonebridge Dr., Saline, Mich. 48176

[21] Appl. No.: 09/205,108

[22] Filed: Dec. 3, 1998

[51] Int. Cl.$^7$ ...................................................... B60Q 1/48
[52] U.S. Cl. ...................................... 340/932.2; 340/932.2; 340/942; 356/3.03; 33/288
[58] Field of Search ................................ 340/932.2, 435, 340/958, 436, 942; 341/176; 455/99; 356/3, 3.01, 3.02, 3.03, 3.1, 153, 399; 33/286, 288

[56] References Cited

U.S. PATENT DOCUMENTS

| | | | |
|---|---|---|---|
| 3,710,798 | 1/1973 | Bredemeier | 128/303.1 |
| 3,904,280 | 9/1975 | Tate, Jr. | 351/1 |
| 3,910,533 | 10/1975 | Cheatham et al. | 244/161 |
| 4,039,894 | 8/1977 | Gardner, III | 315/76 |
| 5,068,887 | 11/1991 | Hughes | 378/170 |
| 5,285,205 | 2/1994 | White | 340/932.2 |
| 5,343,295 | 8/1994 | Lara et al. | 356/399 |
| 5,510,791 | 4/1996 | Viertel et al. | 341/173 |

*Primary Examiner*—Edward Lefkowitz
*Assistant Examiner*—Daryl C. Pope
*Attorney, Agent, or Firm*—Gifford, Krass, Groh, Sprinkle, Anderson & Citkowski, PC

[57] ABSTRACT

A device uses two laser beams to assist in parking a vehicle having a windshield at a desired distance relative to a surface forward of the vehicle, such as the wall of a garage. Independent adjustment means are preferably provided for angling one or both of the first and second beams so as to converge in a localized region of the surface forward of the vehicle when the vehicle is positioned at a desired distance. The preferred embodiment further includes means for mounting the device to a visor within the vehicle, such that the first and second beams pass through the windshield. A momentary contact button on a bottom panel of the enclosure may then be used to activate the laser by squeezing the device against the visor, if so mounted. Within the enclosure there is supported a mirror, prism or other light re-directing element in the path of one of the first and second beams prior to exiting enclosure causing the two beams to converge in a localized region of the wall when the vehicle is parked at a desired distance therefrom. The mirror and beamsplitter are preferably disposed on independently adjustable mounts to assist in fixing the desired distance. As a further option, a dispersive optical element such as a lens may be disposed in the path of one of the first and second beams causing that beam to form a line on the surface forward of the vehicle. Method aspects of the invention are also disclosed.

19 Claims, 2 Drawing Sheets

...

LASER VEHICLE PARKING APPARATUS

FIELD OF THE INVENTION

This invention relates generally to vehicle positioning and, in particular, to portable laser-based apparatus for accurately parking a vehicle such as a car within a garage.

BACKGROUND OF THE INVENTION

Whoever said that Americans have a love affair with their cars was surely correct. Vehicle owners strive to care for their cars, and with the increasing rise in the purchase price for luxury vehicles in particular, car care and maintenance has become increasingly important to sustain value. While it is important to garage an automobile during periods of non-use to protect it from the elements, modern garages are often cluttered with yard tools, garden implements, bicycles, and so forth, such that the space remaining to park one's car is often limited to an area just larger than the car itself.

As a result, the need to park a vehicle within a certain part of a garage or other structure has become increasingly challenging. In addition, with automatic garage door closers, parking of a vehicle in the wrong place could result in harm to the vehicle. Car owners have therefore devised certain homemade remedies to assist in positioning their car within a garage, including the clever use of a tennis ball or other soft article suspended from a string in the garage, such that when the article touches the windshield of the car as it is pulled in, the driver knows that the car is positioned correctly, at least in terms of forward position. Given that most consumers are also fond of electronic gadgetry, the tennis ball on a string is not a very high-tech solution to the problem. It is also not very visually appealing, and may get in the way when people want to walk around in the garage.

One optically oriented technique associated with the exact positioning of an electrically powered vehicle is disclosed in U.S. Pat. No. 5,343,295. According to the teachings of this patent, separate laser sources are mounted on the outside of a vehicle, in the middle of the grill, for example, so as to converge on a target mounted on a charging station. As such, when utilizing the electric vehicle, the operator knows that it is positioned accurately for recharging purposes when the beams converge on a target. While this particular solution does take advantage of an optical approach to the problem, it is not suitable for general purpose garage-type parking, which may not be equipped with an appropriate target, nor are the teachings of the '295 patent extendable to an aftermarket type product, due to the permanent side-to-side mounting of the emitters. Accordingly, the need still remains for an optically based device which would enable the ordinary consumer to park a typical vehicle within a general structure, such as a residential garage.

SUMMARY OF THE INVENTION

The present resides in a device for parking a vehicle having a windshield at a desired distance relative to a surface forward of the vehicle, such as the wall of a garage in front of the vehicle. The preferred embodiment includes a portable enclosure housing operative components including a laser outputting a primary beam of light, an optical element disposed in the path of the primary beam to establish first and second beams which exit the enclosure, and adjustment means for angling one or both of the first and second beams so as to converge in a region of the surface forward of the vehicle when the vehicle is positioned at a desired distance. The preferred embodiment further includes means for mounting the device to a visor within the vehicle, such that the first and second beams pass through the windshield. Removable clips are preferably received on opposing sides of the enclosure for this purpose, enabling the device to be made more compact for travel.

The device preferably includes a momentary contact button on a bottom panel of the enclosure used to activate the laser by squeezing the device against the visor if so mounted. Within the enclosure there is supported a mirror, prism or other light re-directing element in the path of one of the first and second beams prior to exiting enclosure causing the two beams to converge in a localized region of the wall when the vehicle is parked at a desired distance therefrom. The mirror and beamsplitter are preferably disposed on independently adjustable mounts to assist in fixing the desired distance. As a further option, a dispersive optical element such as a lens may be disposed in the path of one of the first and second beams causing that beam to form a line on the surface forward of the vehicle.

Broadly, a method of parking a vehicle at a desired distance from a surface in front of the vehicle according to the invention would comprise the steps of:

providing a device within the vehicle for directing two beams of light onto the surface, the beams being angled with respect to one another so as to converge within a localized region of the surface when the vehicle is parked at the desired distance;

approaching the surface so that the beams are visible on the surface in front of the vehicle; and parking the vehicle when the beams converge on the surface.

DETAILED DESCRIPTION OF THE INVENTION

Figure 1:
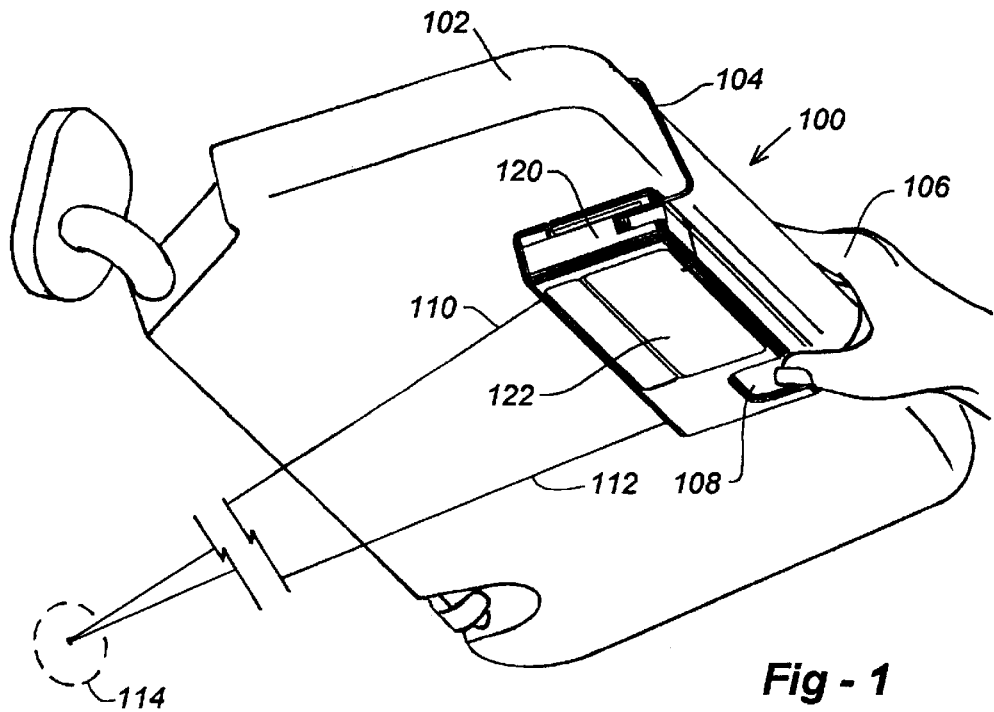
FIG. 1 illustrates, from an oblique perspective, a laser parking device according to the invention removably mounted to the underside of a visor within a motor vehicle.

Turning now to the drawings, FIG. 1 illustrates, generally at 100, a preferred embodiment of the invention having an enclosure 120 and spring clips 104 enabling the device 100 to be conveniently mounted to the underside of a visor 102, as is typically found in motor vehicles. In operation, a user 106 activates the device by depressing a button 108 through squeezing of the device 100 against the visor 102, causing dual light beams 110 and 112 to be emitted from a forward portion of the housing 120. Controls within a compartment 122, which will become better understood with respect to FIGS. 2 and 3, in particular, are used to steer the beams 110 and 112 to converge in an area 114 on any surface forward of the vehicle, thereby indicating that the vehicle has come to rest at a desired distance from this area 114. Due to the controls within compartment 122, this distance is adjustable and, due to the angles subtended by the beams 110 and 112 and the surface upon which the points converge at 114, the device will operate properly even if the vehicle does not approach the forward surface in a direct manner.

Figure 2:
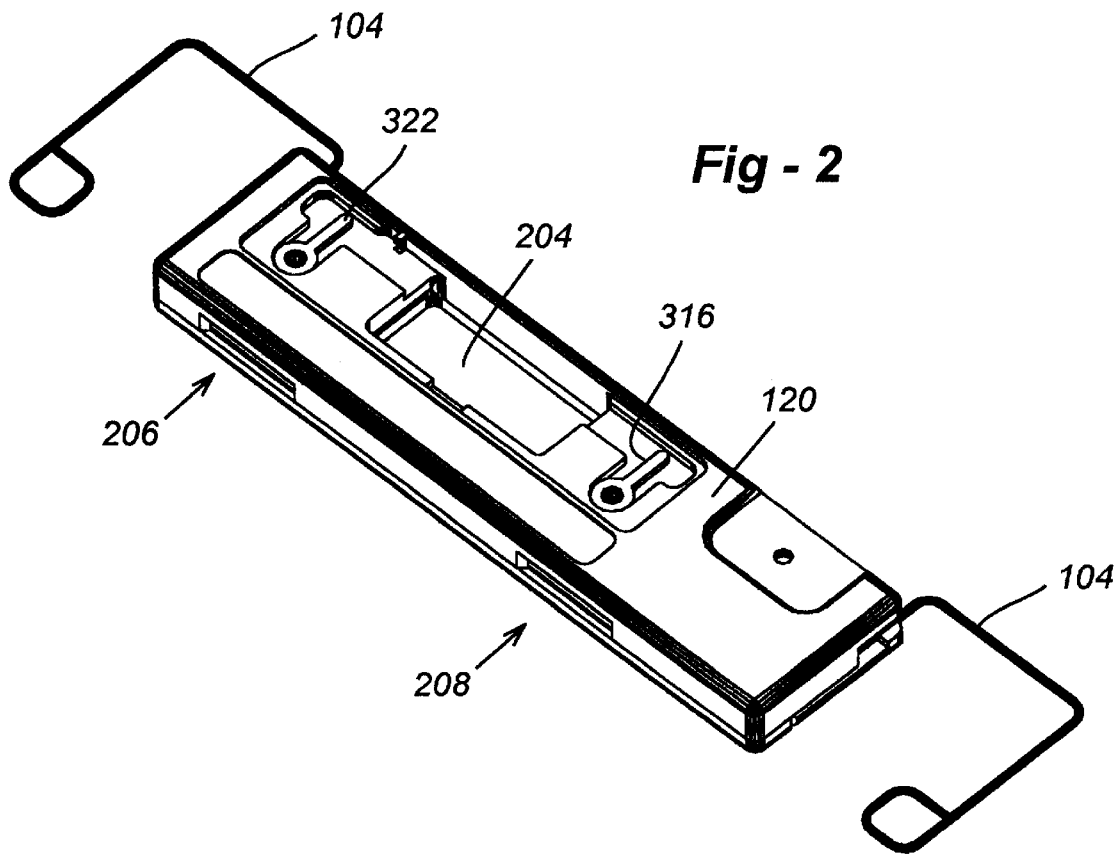
FIG. 2 is a perspective rendering of the device of FIG. 1 removed from the visor and illustrating the interior of a battery compartment and beam-adjustment controls.

FIG. 2 illustrates, from an oblique perspective, the device shown in FIG. 1, but with the cover removed illustrating certain features within the compartment 122 according to a preferred embodiment of the invention. As can be seen in this figure, having removed this cover, a battery compartment 204 is revealed, as are controls 316 and 322, which are used to steer respective beams, as better understood with respect to FIG. 3. Spring clips 104 are attachably removable to either side of the housing 120 shown in FIG. 2, so that the device may more easily slip into one's pocket, for example, for transport purposes. Another advantage is that when the spring clips 104 are mounted and the housing of the device coupled to the underside of a visor, it does not interfere with features that are typically present on the other side of the visor, such as vanity mirrors, airbag instructions, and so forth. The beams used for optically parking the vehicle emerge from ports 206 and 208, which will now be described in reference to FIG. 3.

Figure 3:
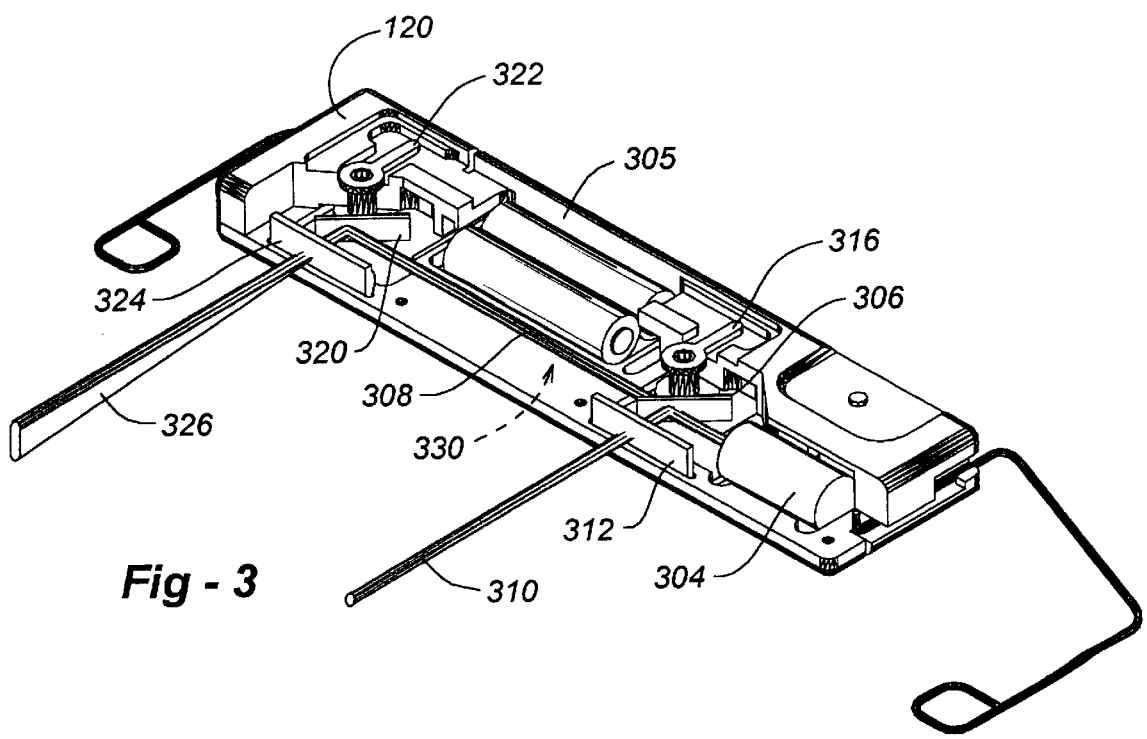
FIG. 3 is a drawing of a laser parking device according to the invention with a portion of the housing removed to show the laser and beam-directing optical elements.
Figure 4:
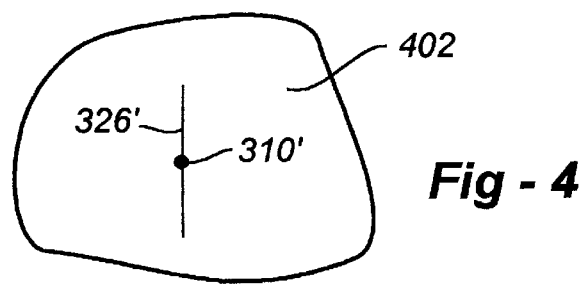
FIG. 4 is a drawings which shows the way in which a dot and line interact when the invention utilizes a beam spreading lens supported in one of the beam paths.

As shown in FIG. 3, a laser 304, typically a unit supplied by such manufacturers as Sony Corporation or Toshiba Corporation, having a power rating of less than 5 mW, emits a primary beam 306 generally parallel to the length of the housing 120. This beam strikes a beamsplitter 306, causing a portion of the beam to be redirected along path 310 through window 312, and another portion of the beam to be directed along path 308. This second beam along path 308 strikes a beam redirection device such as a mirror 320, causing it to emerge through a different window 324. In this particular configuration, the window at 324 is not an optically flat device, but rather, includes a convex surface preferably positioned internal to the housing, causing the beam to spread as shown at 326. As a result, as shown in FIG. 4, the display seen on the surface forward of the vehicle is not two points, but rather, a dot 310' and a line 326', which has been found to be easier to determine the intersection upon a surface 402.

Continuing the reference to FIG. 3, the beamsplitter 306, preferably a commonly available 50:50 splitter plate, is physically coupled to a rotatable element having a lever 316 which is accessible when the battery cover is removed. The turning of this lever causes the beamsplitter 306 to rotate, thereby adjusting the angle of the output beam 310. Similarly, the mirror 320, preferably a first-surface mirror, is coupled to a rotatable device having a lever 322, also accessible when the battery cover is removed, enabling the second beam 326, in this case a spread-out substantially vertical line, to move from side to side. Note that cylindrical lens 324 may be disposed in the path of the beam at 300, for example, prior to redirection by mirror 320.

FIG. 3 also shows the batteries 305 within their compartment. Through the use of a low-powered laser diode module, only three volts are required for operation, and since the device is not operated that frequently, a pair of AA batteries are suitable to activate the device. FIG. 3 also shows the way in which the clips on either side of the housing are received by slots so that, when in position, they may be moved downwardly in the drawing to engage with the visor while, at the same time, by turning them completely around in the opposite direction, they may be entirely removed from the housing for transport.

I claim:

1. A device for parking a vehicle having a windshield at a desired distance relative to a surface forward of the vehicle, comprising:

an enclosure;

a laser outputting a primary beam of light within the enclosure;

an optical element disposed in the path of the primary beam to establish first and second beams which exit the enclosure;

a beam-shaping element causing at least one of the first and second beams to appear as a line on the surface forward of the vehicle;

a adjustment means for angling one or both of the first and second beams so as to converge in a region of the surface forward of the vehicle when the vehicle is positioned at a desired distance therefrom; and means for mounting the enclosure to a visor within the vehicle such that the first and second beams pass through the windshield.

2. The device of claim 1, wherein the means for mounting includes removable clips on opposing sides of the enclosure.

3. The device of claim 1, further including a button on the bottom panel of the enclosure operative to activate the laser.

4. The device of claim 3, wherein the button is a momentary contact switch operated by squeezing the button against the device and visor.

5. The device of claim 1, wherein the line is substantially vertical in appearance.

6. The device of claim 3, further including a mirror disposed in the path of one of the first and second beams prior to exiting enclosure.

7. The device of claim 6, wherein the mirror is on an adjustable mount.

8. The device of claim 1, wherein the optical element is a beamsplitter.

9. The device of claim 8, wherein the beamsplitter is on an adjustable mount.

10. The device of claim 1, wherein the beam-shaping element is a dispersive optical element disposed in the path of one of the first and second beams.

11. A method of parking a vehicle at a desired distance from a surface in front of the vehicle, comprising the steps of:

providing a device within the vehicle for directing two beams of light onto the surface, the beams being angled with respect to one another so as to converge within a localized region of the surface when the vehicle is parked at the desired distance;

shaping at least one of the beams so that it appears as a line on the surface in front of the vehicle;

approaching the surface so that the line and the light of the other beam are visible on the surface in front of the vehicle; and parking the vehicle when the line and light of the other beam converge on the surface.

12. The method of claim 11, further including the step of adjusting one or both of the beams to set the predetermined distance.

13. The method of claim 11, wherein the step of providing a device within the vehicle includes the step of temporarily attaching the device to a visor within the vehicle.

14. The method of claim 13, further including the step of momentarily depressing a switch on the device to generate the two beams of light.

15. The method of claim 11, wherein the step of shaping one of the beams includes the step of dispersing that beam.

16. A device for parking a vehicle having a windshield at a desired distance relative to a wall in front of the vehicle, comprising:

an enclosure having a forward panel, a bottom panel, and means for mounting the device to a visor within the vehicle such that the first and second beams pass through the windshield;

a laser supported within the enclosure outputting a primary beam of light;

a beamsplitter disposed in the path of the primary beam to create a first beam of light which exits the enclosure through the forward panel and second beam of light which continues to travel within the enclosure;

an optical element disposed in the path of the second beam of light causing the second beam to exit the enclosure through the forward panel at a point spaced apart from the point at which the first beam exits the enclosure;

a momentary contact switch mounted on the bottom panel of the enclosure for activating the laser, thereby generating the first and second beams; and adjustment means for angling one or both of the first and second beams so as to converge in a region of the surface forward of the vehicle when the vehicle is positioned at a desired distance therefrom.

17. The device of claim 16, further including a dispersive optical element disposed in the path of one of the first and second beams causing that beam to form a line on the surface forward of the vehicle.

18. The device of claim 16, wherein the means for mounting the device to a visor within the vehicle further includes removable clips on opposing sides of the enclosure.

19. The device of claim 16, wherein the optical element is a mirror.

* * * * *